United States Patent Office 3,438,796
Patented Apr. 15, 1969

3,438,796
ALUMINUM-SILICA-ALUMINUM
FLAKE PIGMENTS
Albert R. Hanke, Westfield, N.J., assignor to E. I. du Pont de Nemours and Company, Wilmington, Del., a corporation of Delaware
No Drawing. Filed Feb. 2, 1967, Ser No. 613,429
Int. Cl. C09c 1/28, 1/64
U.S. Cl. 106—291                    6 Claims

ABSTRACT OF THE DISCLOSURE

Flake pigments of brilliant color made up of layers of thin, translucent films of metallic aluminum with each layer being separated by a thin protective film of silica superimposed on the aluminum and the pigment color varying with thickness of the silica coating. With thicker, substantially opaque aluminum films, successively coated on each side with thin films of silica, aluminum and silica, more brilliant colors are obtained, varying with the thickness of the silica layers adjacent to the central, thick aluminum film.

Background of the invention

This invention relates to novel flake pigment compositions and more particularly to improved, multilayer flake pigments containing aluminum-silica-aluminum exhibiting brilliant interference colors and excellent hiding power when dispersed for use in various coating compositions and plastics.

More specifically, the invention pertains to novel flake pigments of pronounced color and lustrous sparkle containing as essential components adherent films of aluminum and silica. That is, they consist of thin, adherent, translucent, light-transmitting, films or layers of metallic aluminum, each separated by a thin, translucent film of silica, which are successively deposited under controlled conditions in controlled, selected thickness on a central aluminum film or substrate.

Nacreous flake pigments consisting of a plurality of adherent, non-metallic, light transmitting layers differing in refractive index by at least 0.4 and having a specified relationship between thickness and index of refraction, are known, as is the phenomenon of interference colors derived from the selective interference of certain wavelengths of light as it may be reflected simultaneously from the front surface of a thin film and from the back surface of the same film after passing through the film. Such types of pigments and their manufacture are shown in U.S. 3,123,490 and 3,087,828. It has now been found that the combination of silica films with aluminum metal films will provide unexpectedly improved pigments and interference colors, even though the silica and aluminum have essentially the same index of refraction, 1.44 to 1.46.

Summary of the invention

The colored flake pigments exhibiting brilliant interference colors and excellent hiding power of this invention comprise a novel combination of translucent silica films and aluminum films, with the silica superimposed on the aluminum films, whereby desired protection against oxidation and preservation of brilliant pigment color is attained. Production of such pigments is accomplished by the successive depositions of layers of silica and aluminum of selected thickness by vaporization under heat in a suitable vacuum chamber, following which the product is crushed and screened to yield flake pigments of the desired particle size. Alternatively, when a thicker, substantially opaque film of aluminum is coated on each side in succession with thin films of silica, aluminum, and silica, even more brilliant colors are obtained which can be predictably varied by controlling the thickness of the silica layers adjacent to the central thick, substantially opaque aluminum film.

The products of this invention are highly useful pigments of pronounced color and also exhibit a lustrous sparkle which gives them special utility in many applications and compositions. In a suitable fine particle size range (less than 325-mesh, for example) they are useful in automotive enamels as well as in other coating compositions such as paints, lacquers and finishes. In various particle size ranges, they are also useful for coloring plastic articles, as in vinyl films, floor tiles and automotive decorations, etc.

Description of preferred embodiment

The pigment products of this invention can be readily prepared by successively depositing thin layers or films of silica and aluminum on a suitable surface within a vessel, such as a bell jar, adapted to effect silica and aluminum vaporization under heat and a vacuum. Thereafter, the composite product is recovered, crushed and screened to obtain the desired flake pigment. Thus, a thin layer of aluminum (not more than about 20 millimicrons in thickness, and preferably from about 5 to 15 millimicrons in thickness) can be deposited on a suitable substrate in the vacuum chamber of the vaporization vessel, the clean surface of which substrate, preferably, has been pretreated with a suitable release agent adapted to facilitate ready release and recovery of the deposited film. Upon this film is then deposited by a similar technique of evaporation in a vacuum, a thin layer of silica, said film ranging in thickness from about 100 millimicrons to about 600 millimicrons, and preferably from about 450 to 550 millimicrons. This silica film is then covered, in turn, with a second thin film (about 20 millimicrons) of aluminum. The composite film product is then stripped from the substrate, crushed and screened to yield flake pigments of the desired size. The color of the pigments will depend on the thickness of the silica film, and will vary from a pale blue first-order interference color at a film thickness of about 135 millimicrons to much more brilliant third-order violets and greens at film thickness of 400–600 millimicrons. The freshly prepared products exhibit a very attractive color, the brilliance of which is preserved by avoiding oxidation of the bright aluminum surface, preferably by forming a silica coating on either side of the aluminum films. Formation of these oxidation resistant flakes can be brought about by a similar procedure in which a silica film of about 200 millimicrons is first deposited, this being followed sequentially by an aluminum film of 20 millimicrons or less, a silica film of 400–500 millimicrons (the particular thickness selected depending on the color desired), an aluminum film of 20 millimicrons or less, and finally a silica film of about 200 millimicrons.

To obtain products of still more brilliant color, a substantially opaque film of aluminum (at least 60 millimicrons) is utilized as the center of the sandwich. On each side thereof a color determining silica film of about 400–500 millimicrons is deposited, and these in turn, are surrounded by thin films of aluminum (20 millimicrons) and by films of silica (about 200 millimicrons). Formation of this composite sandwich product is brought about in the same general manner as described above in effecting the successive depositions of the appropriate aluminum and silica layers on a suitably treated substrate. On completion of the desired depositions the composite layered structure is removed and fragmented or ground to effect conversion to the desired pigmentary size.

To a clearer understanding of the invention, the following more specific examples are given which merely illustrate the invention in further detail. In these examples, evaporations were conducted in a vacuum of $10^{-5}$ mm. Hg in a conventional type bell jar with a hemispherical portion 10 inches in diameter and a cylindrical portion 10 inches in diameter and 7 inches high. The effective surface is about 2000 cm.$^2$. Heating was by electrodes equipped with tungsten wire baskets comprising a conical helix of wire (approximately ¼" diam. by ¾" long) located near the center line of the cylinder just below the center of the spherical portion. The use of several helices attached to separate electrodes permits the deposition of several layers without breaking the vacuum. Prior to use, the clean inner surface of the bell jar was treated with a very thin film of a silicone stopcock grease as a release agent, such film being spread uniformly over the inner surface of the bell jar.

Example I

Employing the above described bell jar apparatus, multiple electrodes with tungsten baskets are charged respectively with 0.015 gram of aluminum, 0.30 gram of SiO$_2$ and 0.015 gram of aluminum. A vacuum of about $10^{-5}$ mm. Hg is applied to the jar and one of the electrodes containing aluminum is heated until all of the aluminum is evaporated and deposited uniformly on the inner surface of the bell jar, (about 2000 cm.$^2$), to give a film about 20 millimicrons thick. Then the silica is vaporized in like manner and deposited as a film of about 500 millimicrons thickness on top of the aluminum film. Finally, the remaining aluminum charge is vaporized to give a film of about 20 millimicrons. The vacuum is then broken and the deposited film removed by wetting with mineral spirits, as a solvent, and rubbing the wetted walls as necessary to remove the film. The resulting flakes are further fragmented by brushing through a 200-mesh screen in the presence of the mineral spirits. The slurry is then filtered and dried to give a flake pigment with a brilliant third-order violet interference color. The thickness of the individual flakes is about 550 millimicrons.

By varying the amount of silica vaporized in the above operation, the thickness of the central silica film can be effectively controlled. With a film of 400–425 millimicrons, the color is a third-order blue. Thinner films give first- and second-order interference colors of lower intensity. Thicker films of 550–600 millimicrons give third-order greens or even higher order interference colors.

Example II

Example I is duplicated, except that two additional layers of silica are deposited from tungsten helices containing 0.12 gram of silica, one of these being deposited first to give a layer of about 200 millimicrons thickness and the other silica layer of similar thickness being deposited last to give flakes with a total thickness of about 940 millimicrons. The outer layers of silica do not contribute significantly to the color of the flakes, but do protect the aluminum layers from chemical attack, such as oxidation, with consequent dulling of color. Such silica-coated flakes are resistant to attack by boiling dilute HCl.

As in Example I, the thickness of the central silica layer can be varied by controlling the amount of silica evaporated, thus determining the resultant interference colors.

Example III

In this example, a flake pigment product having a central aluminum layer thick enough to give substantially complete reflection is formed to provide a high degree of opacity to the pigment and substantially enhance the brilliance of the color. This product is prepared in the same manner described in Example I, but with use of the following amounts of agents to give the indicated thicknesses of films.

| Layer No. | Agent | Thickness (millimicrons) |
|---|---|---|
| 1 | 0.12 g. SiO$_2$ | 200 |
| 2 | 0.015 g. aluminum | 20 |
| 3 | 0.30 g. SiO$_2$ | 500 |
| 4 | 0.05 g. aluminum | 60 |
| 5 | 0.30 g. SiO$_2$ | 500 |
| 6 | 0.015 g. aluminum | 20 |
| 7 | 0.12 g. SiO$_2$ | 200 |
| Total thickness | | 1,500 |

Pigment color is controlled by the thickness of silica layers #3 and #5, which can be varied as described in Example I. The thickness of the central aluminum layer is the minimum required for substantially complete reflection but it may be thicker without significant change in pigment properties. The outer aluminum layers #2 and #6 must be semi-transparent and should permit transmittance of at least 10% of light. This thickness should not exceed about 40 millimicrons, and preferably does not exceed the indicated 20 millimicrons. The outer silica layers being essentially protective in nature, their thickness is not critical and may vary as much as 25% either way from that shown.

The invention, as above illustrated involves vaporization of the layer materials from a specific type of electrode in a bell jar of fixed dimensions. Obviously the invention is not limited to these operating details nor to the type of apparatus mentioned. Metallic aluminum vaporization is a well known technique, as is the vaporization of silica, which though somewhat more difficult, follows the same principles. These techniques involve evacuation of the system to avoid reaction with gases which might be present and to promote the migration of the vaporized molecules from the electrode to the cool surface on which it is to be deposited. The vacuum employed should not be significantly less than that specified in Example I ($10^{-5}$ mm. Hg) and can range up to $10^{-8}$ mm. Hg if desired. The higher the vacuum, the more effective will be the operation.

In the practical operation of a process for the deposition of multiple layers such as contemplated in Example II, difficulty may be experienced in suitably positioning enough electrodes to provide all of the layers. Therefore, it may be necessary to release the vacuum cautiously and replace the used electrodes with appropriately charged new ones, after which the vacuum can be restored and the processes of vaporization resumed.

I claim:

1. A flake pigment exhibiting an intense interference color made up of alternate thin, adherent films of aluminum and a silica film as essential components, said silica film having a thickness ranging from about 100 to 600 millimicrons and superimposed on and separating said aluminum films.

2. The product of claim 1 in which at least one of the aluminum films is a semi-transparent aluminum film having a thickness of from about 5 to about 40 millimicrons.

3. The product of claim 1 in which the aluminum films are semi-transparent and have a thickness of about 5 to 20 millimicrons and the thickness of the silica film ranges from about 400 to 600 millimicrons.

4. The product of claim 2 in which the additional silica layers of about 200 millimicrons are superimposed on the surfaces of the aluminum films.

5. The product of claim 2 in which said aluminum film other than said semi-transparent aluminum film is opaque having a thickness of at least 60 millimicrons and said product includes, adherent to said opaque aluminum film, a second silica film having a thickness of from about 100 to about 600 millimicrons, and adherent to said second silica film, a semi-transparent aluminum film having a thickness of from about 5 to about 40 millimicrons.

6. The product of claim 5 in which silica films of about 200 millimicrons are super-imposed on surfaces of said semi-transparent aluminum films.

References Cited

UNITED STATES PATENTS 2,387,243   10/1945   Castor _____ 106—291

JAMES E. POER, *Primary Examiner.*